(12) United States Patent
Bartlett (10) Patent No.: US 11,109,004 B2
(45) Date of Patent: Aug. 31, 2021

(54) DISPLAY WITH INCREASED PIXEL COUNT

(71) Applicant: Texas Instruments Incorporated, Dallas, TX (US)

(72) Inventor: Terry Alan Bartlett, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/050,599

(22) Filed: Jul. 31, 2018

(65) Prior Publication Data

US 2020/0045273 A1    Feb. 6, 2020

(51) Int. Cl.
| | |
|---|---|
| *H04N 9/31* | (2006.01) |
| *G03B 21/20* | (2006.01) |
| *G02B 26/08* | (2006.01) |
| *G03B 21/28* | (2006.01) |
| *G09G 3/00* | (2006.01) |

(52) U.S. Cl.
CPC ....... *H04N 9/3164* (2013.01); *G02B 26/0833* (2013.01); *G03B 21/2013* (2013.01); *G03B 21/28* (2013.01); *H04N 9/3111* (2013.01); *G09G 3/007* (2013.01)

(58) Field of Classification Search
CPC .. G03B 21/008; G03B 21/006; G03B 21/005; G03B 21/14; G03B 21/2006; G03B 21/2013; G03B 21/2033; G03B 21/2066; G03B 21/28; G03B 21/00–64; H04N 9/3102; H04N 9/3108; H04N 9/3111; H04N 9/3147; H04N 9/315; H04N 9/3161; H04N 9/3164; H04N 9/3167; H04N 9/3188; H04N 13/354; H04N 9/31–3197; G02B 27/1033; G02B 5/04; G02B 27/00–0189; G02B 26/08
See application file for complete search history.

(56) References Cited

U.S. PATENT DOCUMENTS

| | | |
|---|---|---|
| 2,718,811 A | 9/1955 | Riepert et al. |
| 5,113,202 A | 5/1992 | Loce et al. |
| (Continued) | | |

FOREIGN PATENT DOCUMENTS

| | | |
|---|---|---|
| SU | 339770 A1 | 5/1972 |
| TW | 200528752 A | 9/2005 |

OTHER PUBLICATIONS

Hallstig, "Nematic Liquid Crystal Spatial Light Modulators for Laser Beam Steering," Dissertation No. 1048, University of Uppsala (2004) Acta Universitatis Upsaliensis, Comprehensive Summaries of Uppsala Dissertations from the Faculty of Science and Technology, P.O. Box 256, SE-751 05 Uppsala, Sweden ISBN 91-554-6110-7.

(Continued)

*Primary Examiner* — Michelle M Iacoletti
*Assistant Examiner* — Christopher A Lamb, II
(74) *Attorney, Agent, or Firm* — Michelle F. Murray; Charles A. Brill; Frank D. Cimino (57) ABSTRACT

An example projector includes: a first light source to provide first light; and a second light source to provide second light. A spatial light modulator produces: first modulated light by modulating the first light; and second modulated light by modulating the second light. An image direction device directs: the first modulated light to project a first image having a first pixel position; and the second modulated light to project a second image having a second pixel position.

26 Claims, 13 Drawing Sheets

(56) References Cited

U.S. PATENT DOCUMENTS

| | | | |
|---|---|---|---|
| 5,626,411 A * | 5/1997 | Takahashi | G02B 1/06 348/E17.005 |
| 6,185,016 B1 | 2/2001 | Popovich | |
| 6,222,627 B1 | 4/2001 | Seitz et al. | |
| 6,542,282 B2 | 4/2003 | Smith et al. | |
| 6,897,991 B2 | 5/2005 | Huffman et al. | |
| 6,906,852 B1 * | 6/2005 | Russell | G02B 27/1033 345/32 |
| 7,001,022 B2 | 2/2006 | Kim et al. | |
| 7,092,137 B2 | 8/2006 | Childers | |
| 7,106,491 B2 | 9/2006 | Meyer et al. | |
| 7,551,341 B1 * | 6/2009 | Ward | G09G 3/3426 359/259 |
| 8,542,427 B2 | 9/2013 | Merhl | |
| 10,359,635 B2 | 7/2019 | Grey et al. | |
| 10,684,489 B2 | 6/2020 | Kroll et al. | |
| 10,768,516 B2 | 9/2020 | Bartlett et al. | |
| 10,809,664 B2 | 10/2020 | Seo et al. | |
| 2003/0002770 A1 | 1/2003 | Chakravorty et al. | |
| 2003/0039444 A1 | 2/2003 | Mossberg et al. | |
| 2003/0063226 A1 | 4/2003 | Gibbon et al. | |
| 2004/0046946 A1 * | 3/2004 | Kim | G03B 3/00 353/101 |
| 2005/0018308 A1 | 1/2005 | Cassarly et al. | |
| 2005/0018309 A1 * | 1/2005 | McGuire, Jr. | G02B 27/0081 359/630 |
| 2005/0105016 A1 * | 5/2005 | Kurihara | H04N 9/3108 349/96 |
| 2005/0134805 A1 * | 6/2005 | Conner | H04N 9/3188 353/46 |
| 2005/0207700 A1 | 9/2005 | Gruhlke | |
| 2010/0079685 A1 | 4/2010 | Endo et al. | |
| 2010/0097674 A1 | 4/2010 | Kasazumi et al. | |
| 2010/0284090 A1 | 11/2010 | Simmonds | |
| 2011/0141439 A1 * | 6/2011 | Yamauchi | G02B 27/1046 353/31 |
| 2011/0234985 A1 * | 9/2011 | Ryf | G03B 21/14 353/38 |
| 2012/0013852 A1 | 1/2012 | Champion et al. | |
| 2012/0327376 A1 * | 12/2012 | Mehrl | G02B 26/0833 353/37 |
| 2013/0170005 A1 * | 7/2013 | Kurashige | H04N 9/3129 359/15 |
| 2015/0268546 A1 * | 9/2015 | Huang | G03B 35/26 349/5 |
| 2016/0150225 A1 * | 5/2016 | Kurashige | G03B 21/2013 353/8 |
| 2016/0363869 A1 | 12/2016 | Hou | |
| 2017/0219821 A1 * | 8/2017 | Lambert | G02B 27/0101 |
| 2018/0172893 A1 | 6/2018 | Fattal et al. | |
| 2018/0284460 A1 | 10/2018 | Cheng et al. | |
| 2019/0179149 A1 | 6/2019 | Curtis et al. | |

OTHER PUBLICATIONS

Jiang, "Nitride micro-LEDs and beyond—a decade progress review," Optics Express, vol. 21, Issue S3, pp. A475-A84 (2013) The Optical Society, 2010 Massachusetts Ave, NW Washington, DC 20036 USA (https://doi.Org/10.1364/OE.21.00A475)

International Search Report and Written Opinion dated Oct. 31, 2019, PCT Application No. PCT/US2019/044354, 7 pages.

Kim, N., et al., "Holographic Optical Elements and Application," http://dxdoiorg/105772/67297. Holographic Materials and Optical Systems, Chapter 5, 2017, pp. 99-131.

Ando, T., et al. "Head Mounted Display for Mixed Reality using Holographic Optical Elements," Mem Fac. England, Osaka University, Sep. 30, 1999, vol. 40, pp. 1-8.

Bigler, C., et al., "Holographic Waveguide Heads-up Display for Longitudinal Image Magnification and Pupil Expansion," Applied Optics, Mar. 20, 2018, vol. 57, No. 9, pp. 2007-2013.

Piao, N., et al., "Full Color Holographic Optical Element Fabrication for Waveguide Mounted Display Using Photopolymer," OSA-The Optical Society, Journal of the Optical Society of Korea, Jun. 2013, vol. 17, No. 3, pp. 242-248.

International Search Report and Written Opinion dated Jan. 28, 2021, PCT Application No. PCT/US2020/055721, 9 pages.

Final Office Action dated Feb. 16, 2021, U.S. Appl. No. 16/428,680, filed May 31, 2019, 17 pages.

* cited by examiner

DISPLAY WITH INCREASED PIXEL COUNT

TECHNICAL FIELD

This relates generally to projection displays, and more particularly to projection displays with increased resolution.

BACKGROUND

In spatial light modulator (SLM) projection systems, which use the SLM to generate a displayed image, extended pixel resolution (XPR) is a technique for causing the displayed image's resolution to be higher (greater pixel density) than the SLM's resolution. In an example technique for accomplishing two-way XPR, a glass plate is interposed in a light path after the light has been modulated by the SLM. An actuator moves the plate between shifted and unshifted positions. The shifted position causes pixels of the displayed image to shift by one-half pixel in both the x and y directions, thereby placing the center of a shifted pixel at an intersection of four unshifted pixels. The actuator moves the plate between the shifted and unshifted positions rapidly enough for a human eye to see the combination of shifted and unshifted pixels as an image having double the SLM's resolution. This technique can be extended to 4-way XPR or arbitrarily-high resolution by moving the plate to more sub-pixel positions (e.g. four). However, the optics and the actuator for the plate are not compact, so this technique is not suitable for compact applications, such as pico-projectors. Also, an actuator capable of high speed and precise operation is costly.

SUMMARY

An example projector includes: a first light source to provide first light; and a second light source to provide second light. A spatial light modulator produces: first modulated light by modulating the first light; and second modulated light by modulating the second light. An image direction device directs: the first modulated light to project a first image having a first pixel position; and the second modulated light to project a second image having a second pixel position.

DETAILED DESCRIPTION

In the drawings, corresponding numerals and symbols generally refer to corresponding parts unless otherwise indicated. The drawings are not necessarily drawn to scale.

In this description, the term "coupled" may include connections made with intervening elements, and additional elements and various connections may exist between any elements that are "coupled."

Figure 1A:
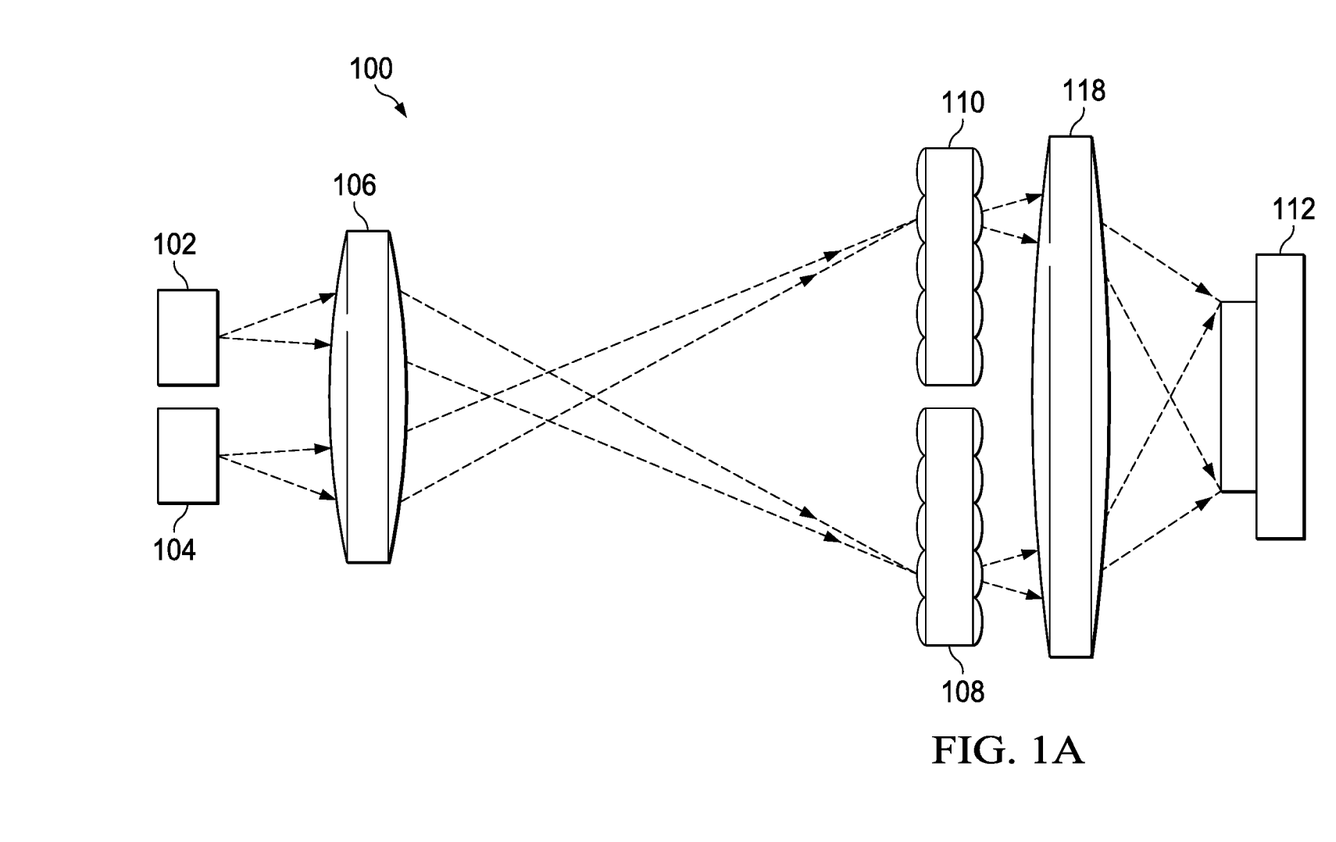
FIG. 1A is a diagram of a light generation portion of an example projector.

FIG. 1A shows a light generation portion 100 of an example projector. Light source 102 and light source 104 may be LEDs, laser diodes or other high intensity light sources. In this example, light source 102 and light source 104 produce the same color light. For example, light source 102 and light source 104 may produce red for a red-green-blue (RGB) projection system. In other examples, light source 102 and light source 104 may produce white light and use a filtering system, such as a color wheel to produce the necessary colors for projection.

Light source 102 and light source 104 project through lens 106. Lens 106 may be a single lens or a system of lenses. In the drawings, light projection lines are schematic and do not show the complete path of the light, but show the general path of the light. Lens 106 focuses the images of light sources 102 and 104 onto fly's eye array 108 and fly's eye array 110, respectively. Fly's eye array 108 and fly's eye array 110 include many small lenses. These arrays may include dozens or thousands of small lenses. The purpose of these lenses is to homogenize or "even out" the light to provide uniform light and eliminate the image of the light source. In the example of FIG. 1, two fly's eye arrays enhance the geometric separation of the two light paths from light source 102 and light source 104. However, one fly's eye array may be used for both paths in some examples. Lens 118 may be a single lens or a group of lenses. In this example, spatial light modulator (SLM) 112 is a digital micromirror device (DMD). Lens 106, fly's eye array 108, fly's eye array 110 and lens 118 preserve an angular difference to the light provided by light source 102 and light source 104, so that the light from light sources 102 and 104 addresses SLM 112 at different angles.

Figure 1B:
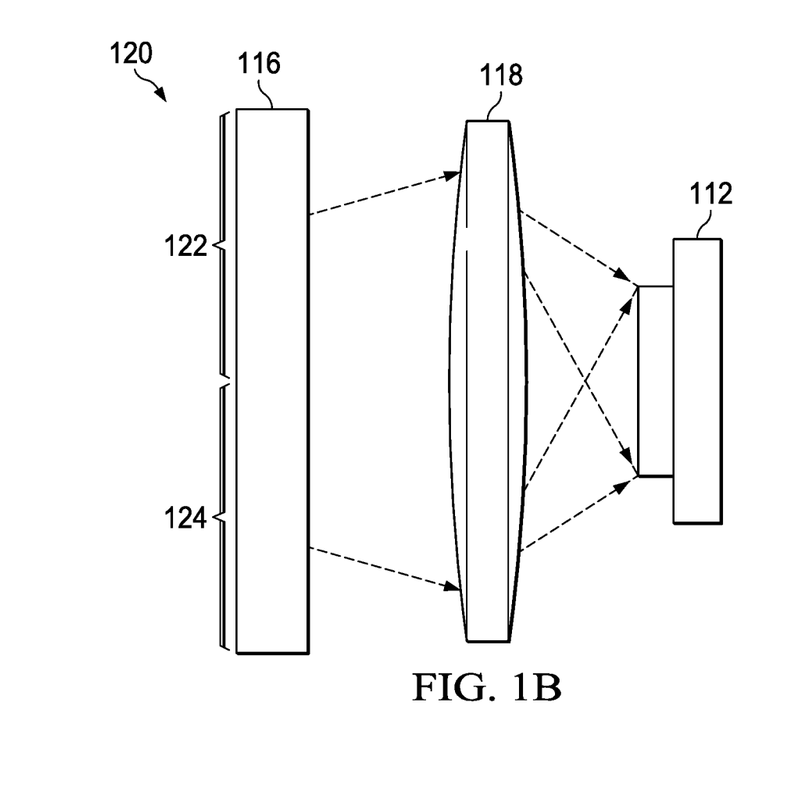
FIG. 1B is a diagram of another example light generation portion

FIG. 1B shows another light example generation portion 120. In light generation portion 120, micro LED array 116 (FIG. 1B) replaces light source 102, light sources 104, lens 106, fly's eye array 108 and fly's eye array 110 of light generation portion 100 (FIG. 1A). If a more uniform illumination of the DMD is desired, the micro LED array 116 can be placed directly before the fly's eye array 108 and fly's eye array 110 in the optical path. Thus, light generation portion 120 is more compact than light generation portion 100 (FIG. 1A). Micro LED arrays can include thousands or millions of individually addressable LEDs, but less expensive micro LED arrays with fewer than 100 elements can be used. These LEDs may be one color or different colors. An example configuration includes clusters of red, green and blue LEDs to enable production of a color gamut. To substitute for light source 102 and light source 104, the micro LED array 116 is divided into sections on different portions of the micro LED array 116. For example, micro LED array 116 includes section 122 and section 124 in the example of FIG. 1B. The physical separation of section 122 and sections 124 provides the angular separation of the light, as described hereinbelow regarding FIG. 2. Jiang et al., "Nitride micro-LEDs and beyond—a decade progress review," Optics Express, Vol. 21, Issue S3, pp. A475-A484

(2013) (https://doi.org/10.1364/OE.21.00A475) describes micro LED arrays in more detail and is incorporated herein by reference.

Figure 1C:
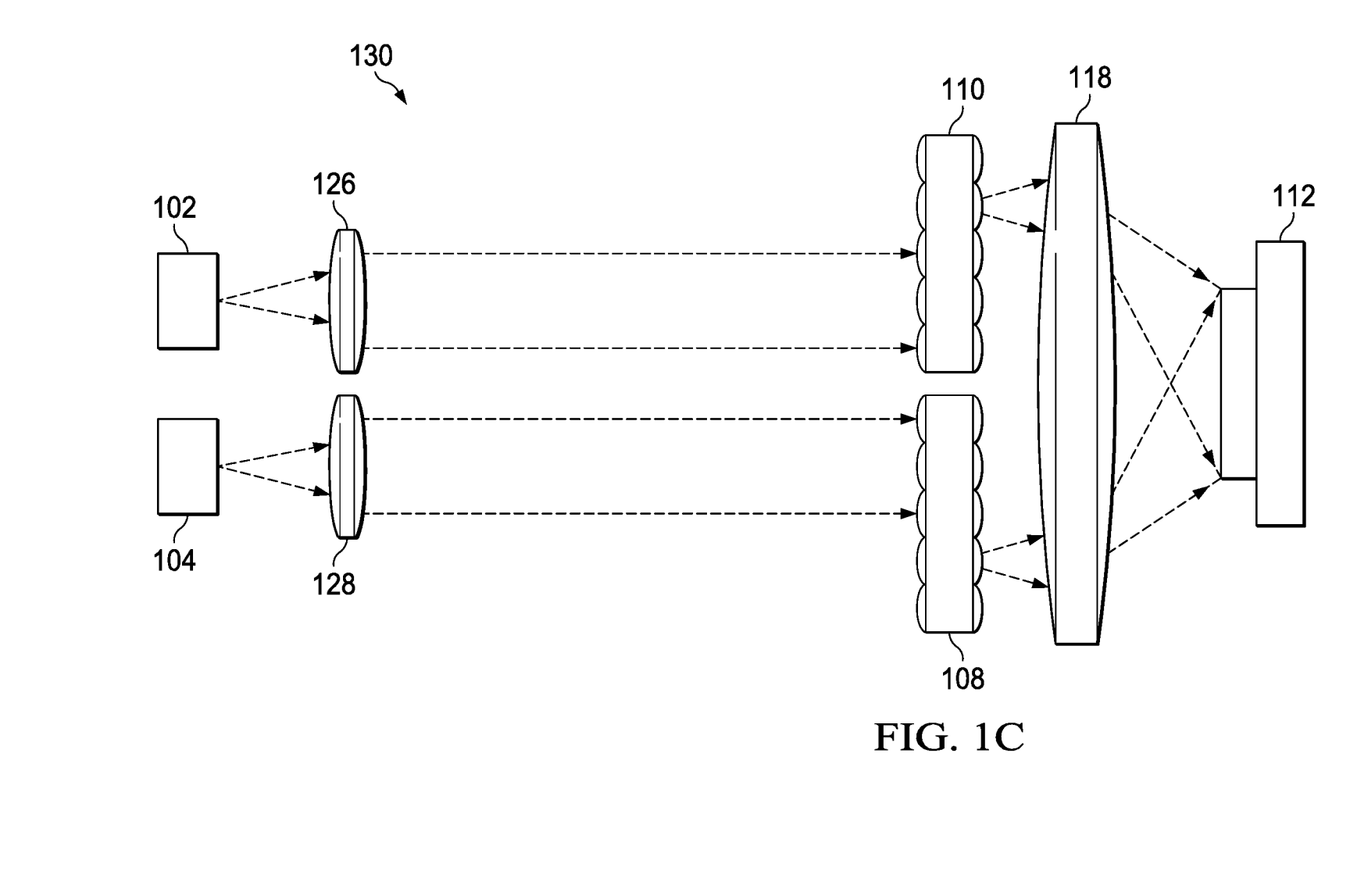
FIG. 1C is a diagram of another example light generation portion.

FIG. 1C shows another example light generation portion 130. In light generation portion 130, lenses 126 and 128 (FIG. 1C) replace lens 106 of light generation portion 100 (FIG. 1A). The configuration of lens 126 and lens 128 provides more collimated light to fly's eye arrays 110 and 108, respectively, which improves efficiency. The configuration of light generation portion 130 provides better directional control of the light supplied to SLM 112 at the cost on an additional lens (i.e., two lenses 126 and 128 vs. one lens 106 (FIG. 1A)).

Figure 2:
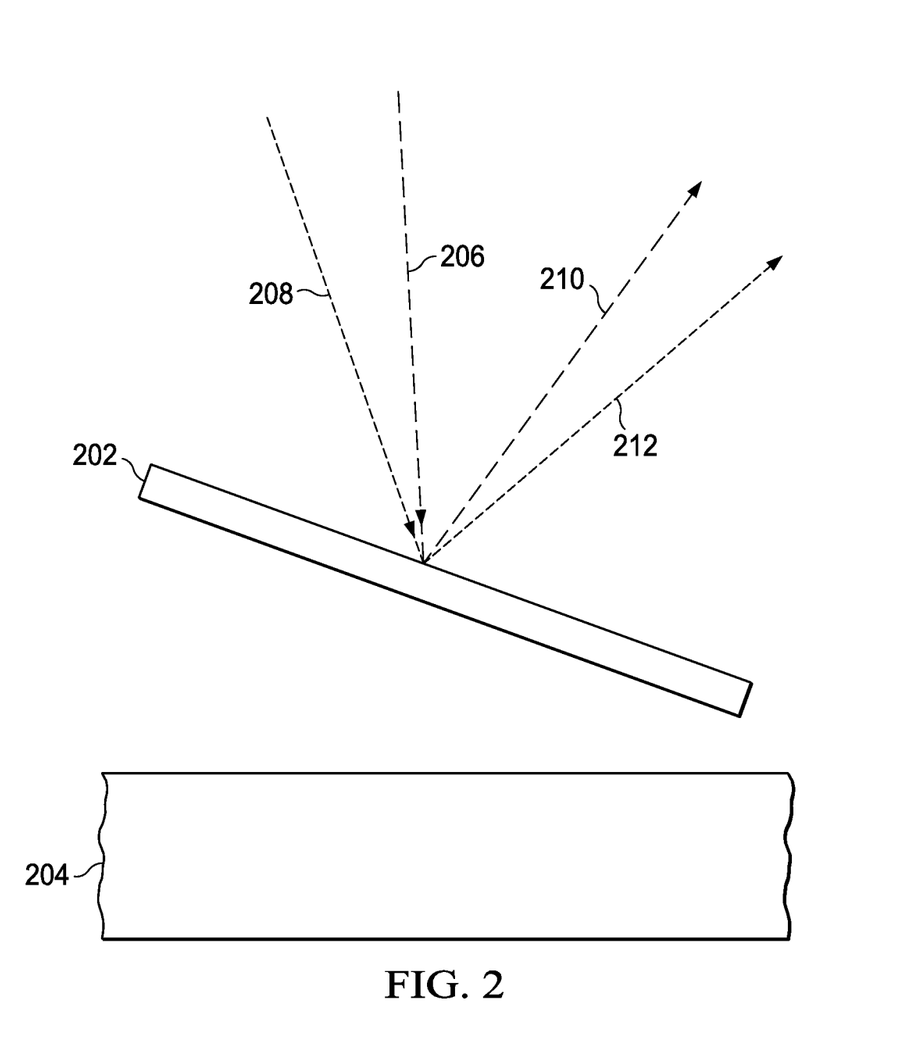
FIG. 2 is a schematic diagram of one pixel of a spatial light modulator (SLM).

FIG. 2 shows one pixel of SLM 112. In this example, SLM 112 is a DMD. In another example, SLM 112 may be a liquid crystal on silicon (LCOS) modulator or another type of modulator. In at least one example, SLM 112 includes 2560×1600 (4,096,000) individually addressable mirrors. In FIG. 2, one mirror 202 is tilted in the ON position relative to substrate 204. The ON position is the position that reflects the incident light to projection optics. Other mirrors that are in the OFF position reflect the light away from projection optics. In this way, SLM 112 (FIG. 1) modulates the light to provide the desired image. This modulation is performed many times per image frame to provide desired shades and light intensity. As shown in FIG. 2, light 206 strikes mirror 202 at a different angle that light 208. In this example, light 206 is from light source 104 (FIG. 1), and light 208 is from light source 102 (FIG. 1). Mirror 202 is flat, so light 206 is reflected as reflected light 210 at the angle of incidence of light 206 onto mirror 202. Similarly, light 208 is reflected as reflected light 212 at the angle of incidence of light 208 onto mirror 202. Therefore, reflected light 210 and reflected light 212 leave SLM 112 (FIG. 1) at different angles.

Figure 3:
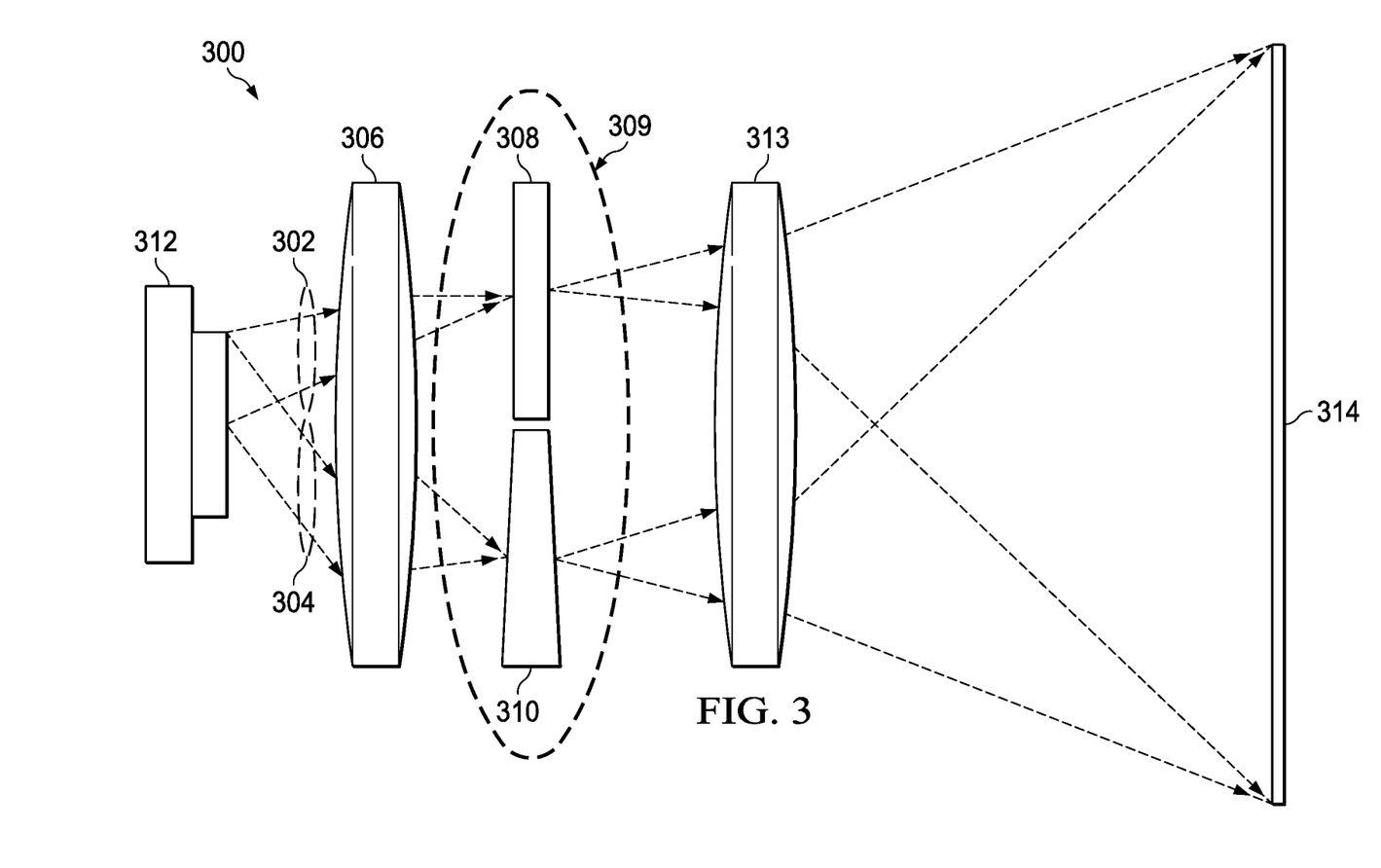
FIG. 3 is a diagram of an image projection portion of an example projector.

FIG. 3 shows an image projection portion 300 of an example projector. SLM 312 is the same as SLM 112 (FIG. 1). Modulated light 302 is the same as reflected light 210 (FIG. 2), and modulated light 304 is the same as reflected light 212 (FIG. 2). Lens 306 focuses modulated light 302 onto plate 308. Lens 306 also focuses modulated light 304 onto plate 310. Together, plate 308 and plate 310 form an image direction device 309. In this example, plate 308 is a flat glass plate that does not significantly modify the path of modulated light 302. Also, in this example, plate 310 is a trapezoidal plate (also known as a wedge prism) that shifts the pixel position of modulated light 304 one-half pixel in the horizontal direction (x direction) and one-half pixel in the vertical direction (y direction). In other examples, plate 310 may be a flat plate that is tilted to provide the desired pixel shift. Lens 313 projects modulated light 302 from plate 308 and modulated light 304 from plate 310 onto target 314. In this example, target 314 is a projection screen.

Figure 4:
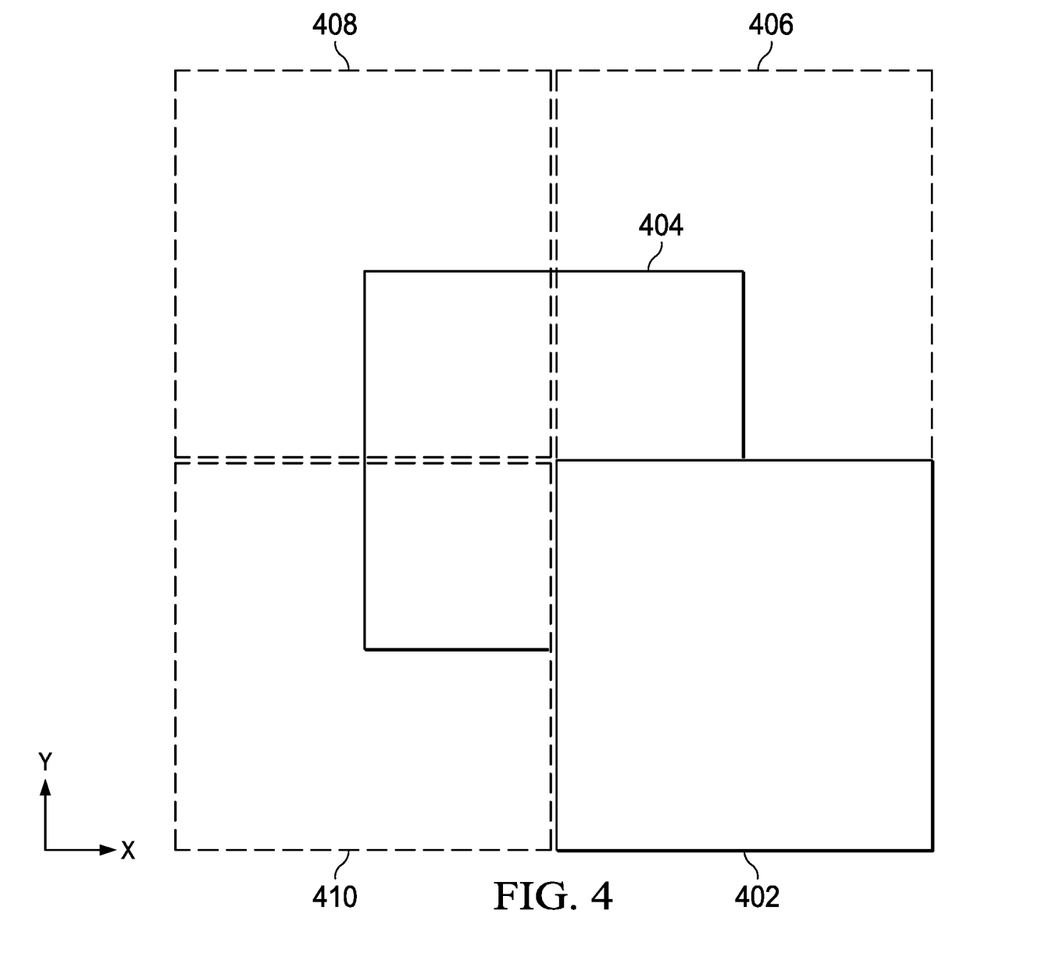
FIG. 4 is a diagram showing relative pixel position of two pixels.

FIG. 4 shows the relative pixel position of two pixels, which are: (a) a first pixel from modulated light 302 (FIG. 3); and (b) a second pixel from modulated light 304 (FIG. 3). Pixel 402 is an unshifted pixel from modulated light 302 (FIG. 3). Pixel 404 is a shifted pixel from modulated light 304 (FIG. 3). In this example, pixel 404 is shifted one-half pixel in the positive y direction and one-half pixel in the negative x direction. Other examples may shift in different directions relative to the x/y axis as shown in FIG. 4. The center of pixel 404 is approximately at a corner of pixel 402. Pixels 406, 408 and 410, which are pixels from modulated light 302 (FIG. 3), are adjacent to pixel 402. The center of pixel 404 is at the corner of pixels 402, 406, 408 and 410 and equidistant from the center of those pixels. By alternating different modulations of modulated light 302 and modulated light 304 several times in a frame, a human viewer's eye integrates the two modulations, and the image appears to have twice as many pixels as SLM 312. The example of FIGS. 1-4 achieves this alternation between modulations by alternately turning on and off light sources 102 and 104 (FIGS. 1A and 1C) or sections 122 and 124 of micro LED array 116 (FIG. 1B). Thus, extended pixel resolution (XPR) is achieved without any mechanical pixel shifting device. Also, because light sources 102 and 104 are only on for half of the time (50% duty cycle), power dissipation issues for these high intensity light sources are significantly eased.

Figure 5:
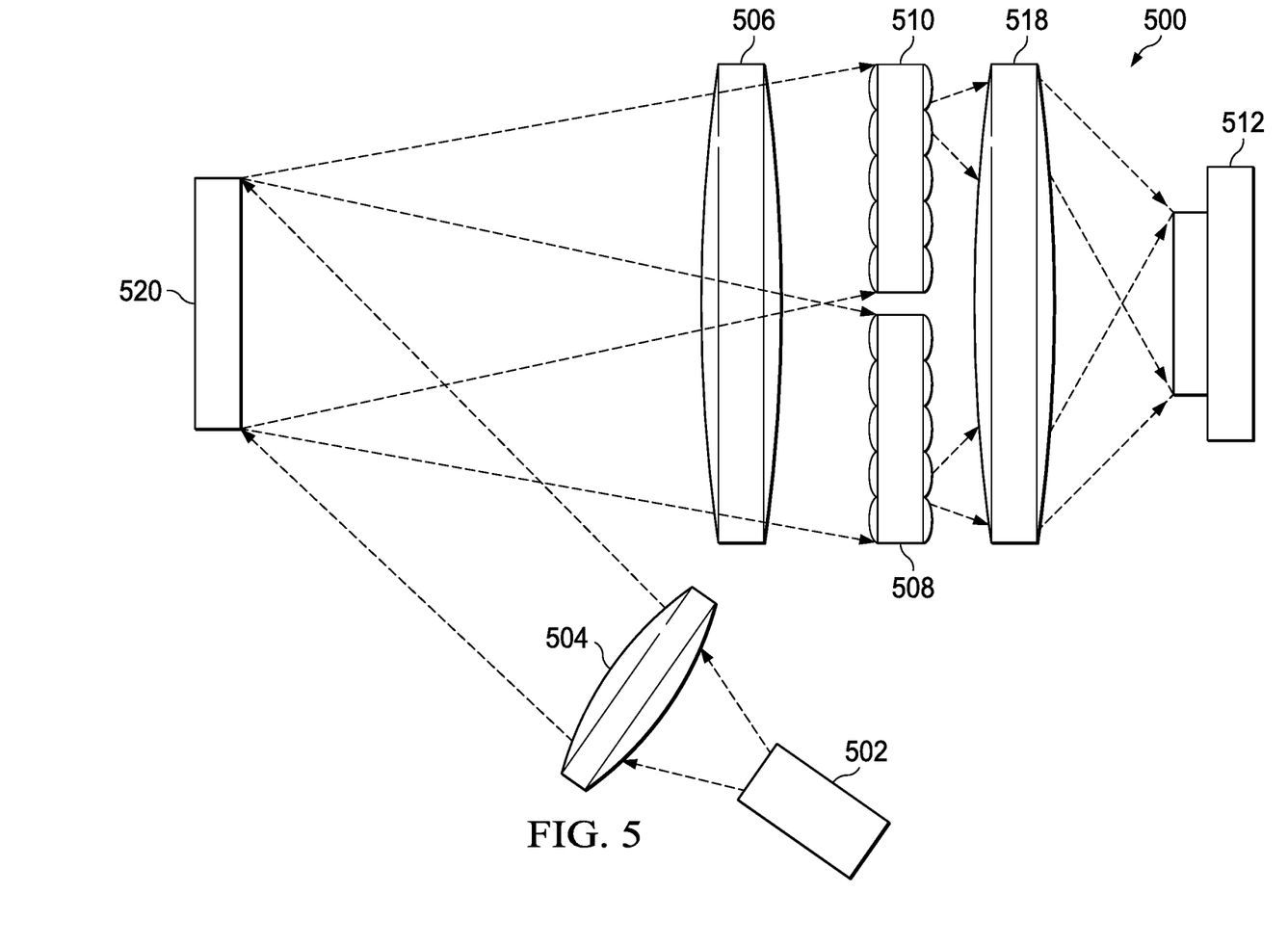
FIG. 5 is a diagram of another example light generation portion.

FIG. 5 shows another example light generation portion 500 using one light source 502. Light source 502 may be a highly-coherent light source, such as a laser or very small LED or arc lamp source. Lens 504 focuses the light from light source 502 onto steering device 520. Steering device 520 alternately directs the light from light source 502 toward fly's eye array 508 or fly's eye array 510. In another example, a single fly's eye array substitutes for fly's eye array 508 and fly's eye array 510, with the steering device 520 directing the light from light source 502 to different parts of the single array. In this example, steering device 520 is a phase light modulator (PLM). A phase light modulator steers light by altering a diffraction grating on its surface. The different diffraction grating changes the angle of reflection of the PLM (see Hallstig, "Nematic Liquid Crystal Spatial Light Modulators for Laser Beam Steering," Dissertation No. 1048, University of Uppsala (2004), which is incorporated herein by reference). A phase light modulator may be a DMD, liquid crystal on silicon (LCOS) or other type of spatial light modulator. In another example, steering device 520 is an actuated mirror.

Steering device 520 directs light received from light source 502 onto one of two paths. For the first path, the light is directed to fly's eye array 508 through lens 506. For the second path, the light is directed to fly's eye array 510 through lens 506. As with lens 106 (FIG. 1), lens 506 may be a group of lenses or a single lens. In this example, lens 506, fly's eye array 508, fly's eye array 510, lens 518 and SLM 512 operate the same as lens 106, fly's eye array 108, fly's eye array 110, lens 118 and SLM 112 of FIG. 1. In this example, a projection section, which is the same as projection portion 300 (FIG. 3), projects the light modulated by SLM 512. For example, plate 308 (FIG. 3) directs one path, and plate 310 (FIG. 3) directs the other path.

Figure 6:
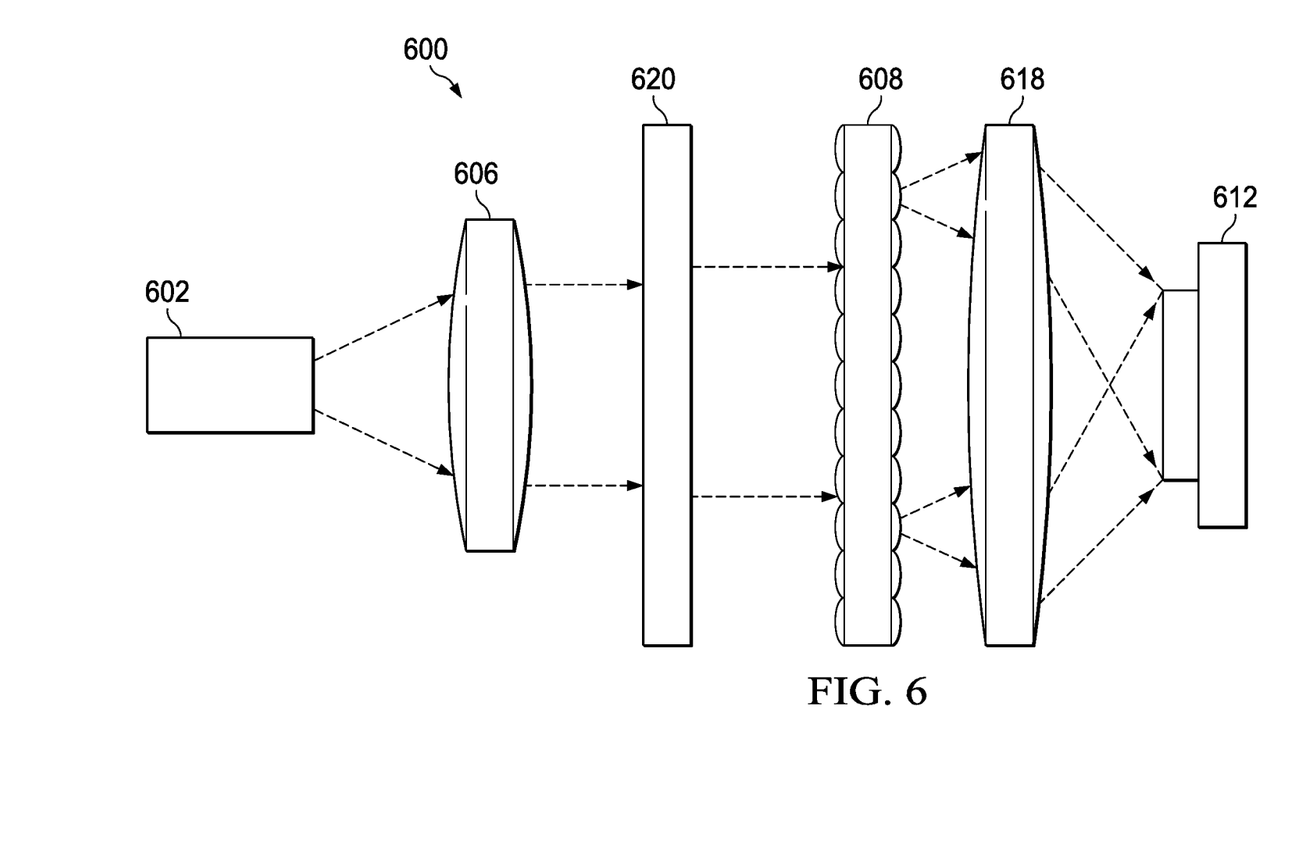
FIG. 6 is another example light generation portion.

FIG. 6 shows another example light generation portion 600. In at least one example, polarized light source 602 is a laser. Light from polarized light source 602 is focused by lens 606 onto polarization rotator 620. Polarization rotators direct the polarization of the light passing through the rotator. For example, in one state, the polarization is unchanged. In another state, the polarization is rotated 90 degrees. An example liquid crystal polarization rotator is the LCR1-633, which is commercially available from Thorlabs, Inc. The polarized light from polarization rotator 620 is homogenized and focused by fly's eye array 608 and lens 618 onto SLM 612.

Figure 7:
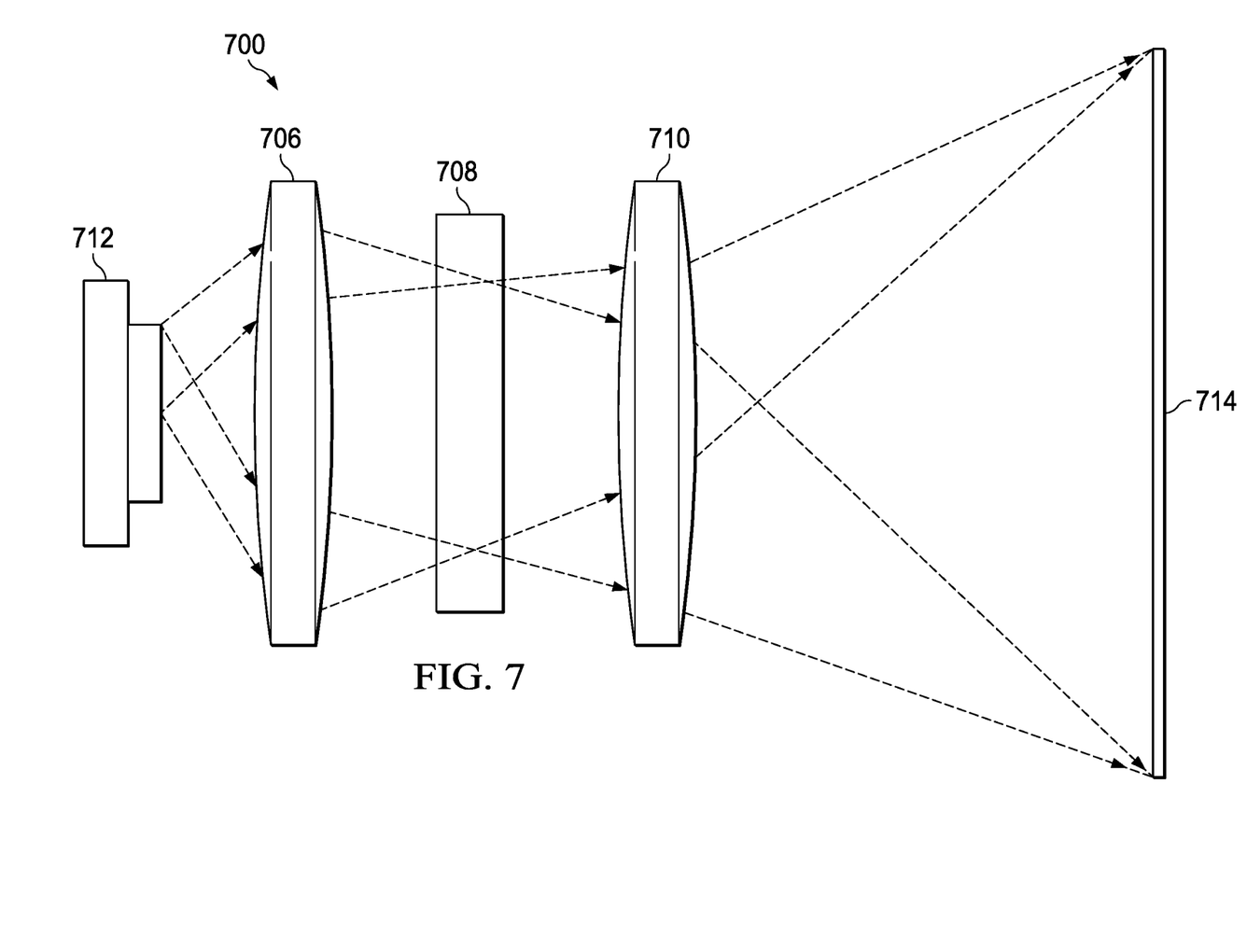
FIG. 7 is an example projection section for use with the example light generation portion of FIG. 6.

FIG. 7 shows an example projection portion 700 for use with the example light generation portion 600 (FIG. 6). SLM 712 is the same as SLM 612 of FIG. 6. Lens 706 focuses modulated light from SLM 712 onto birefringent element 708. As described hereinabove regarding FIG. 6, light generation portion 600 (FIG. 6) provides light having at least two different polarizations. In at least one example, birefringent element 708 is a Wollaston prism that has a different refractive index for different polarization of light. U.S. Pat. No. 6,222,627, which is incorporated herein by reference, describes an example Wollaston prism. The polarization angles selected by polarization rotator 620 (FIG. 6) and the position of the birefringent element 708 are suitable to shift the pixel position of one polarization by one-half pixel in the x and y directions relative to the other polarization. Lens 710 projects the modulated light from birefringent element 708 onto screen 714.

Figure 8:
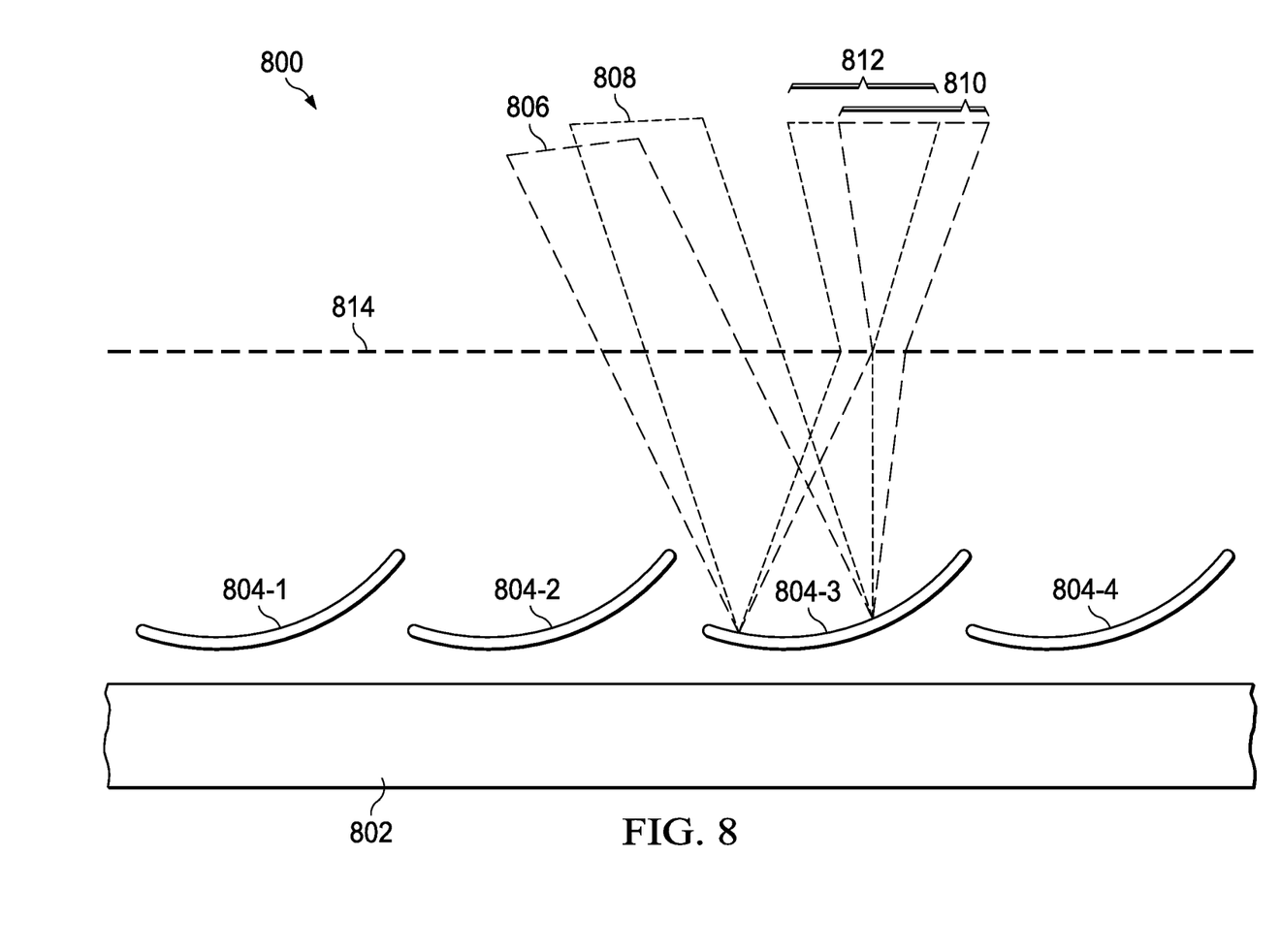
FIG. 8 is a diagram of an example spatial light modulator using cupped mirrors.

FIG. 8 shows an example spatial light modulator 800 using cupped mirrors. The illumination systems described hereinabove can be used with cupped mirrors to make smaller pixel images, thereby increasing the true resolution (expressed as Modulation Transfer Function or MTF) of the projector using XPR. Mirrors 804-1 through 804-4 are cupped mirrors formed on substrate 802. Like a DMD, each mirror is individually addressable and is tilted in either: (a) an ON state to reflect light to the projection optics; or (b) an OFF state to reflect light away from the projection optics. In this manner spatial light modulator 800 modulates light. FIG. 8 shows only four mirrors, but a configuration may include thousands of mirrors, a million mirrors or more. Mirrors 804-1 through 804-4 are formed in a concave or cupped shape using a process described in U.S. Pat. No. 8,542,427, which is incorporated herein by reference. FIG. 8 shows light 806 and light 808 reflecting off mirror 804-3 as light 810 and light 812, respectively. However, all mirrors in spatial light modulator 800 receive this light and selectively reflect it. Light 806 and light 808 are generated from a light generation portion, such as light generation portion 100 of FIG. 1A. Light 806 is generated by a light source, such as light source 102 (FIG. 1A). Light 808 is generated by a light source, such as light source 104 (FIG. 1A). Light 806 strikes mirror 804-3 at a different angle than light 808. Therefore, light 806 and light 808 reflect at different angles creating focused pixel images at different positions.

Because mirrors 804-1 through 804-4 are concaved or cupped, they act as a lens with a focal point 814 above the surface of mirrors 804-1 through 804-4. Thus, the projection optics must be moved to focal point 814. Also, for example, the light reflected from mirror 804-3 is smaller than the pixel size of mirror 804-3. FIG. 8 shows two light sources. An example may include four light sources, and the reflected pixel is one-fourth the pixel size of mirror 804-3. These four light sources are directed to one of four quadrants of the pixel size of mirror 804-3. Thus, by alternately illuminating the four light sources, spatial light modulator 800 produces a projection image with four times the pixel density of mirrors 804-1 through 804-4.

Figure 9:
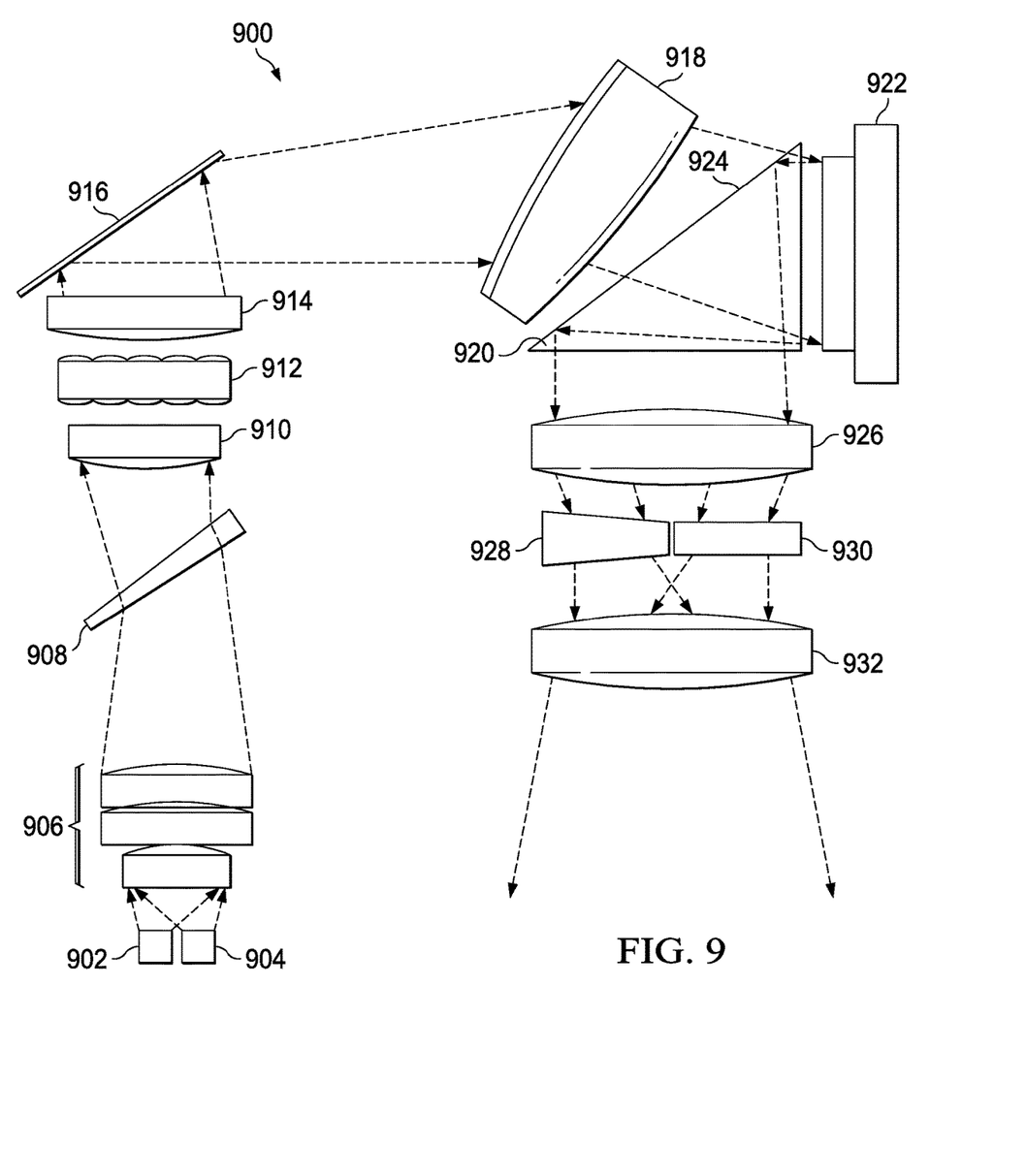
FIG. 9 is a diagram of an example projector configuration.

FIG. 9 shows an example projector configuration 900. Light sources 902 and 904 produce light from two positions. Lenses 906 direct the light to prism 908. Prism 908 directs the light onto lens 910, through fly's eye array 912 and lens 914 to mirror 916. Prism 908 depicts a wedge prism that can be coated with wavelength filters to allow for combining multiple colors (not shown). Mirror 916 reflects the light through lens 918, through prism 920 to spatial light modulator 922. The ON state light reflects from spatial light modulator 922 and reflects off surface 924 of prism 920 by total internal reflection. Lens 926 focuses the light reflected from surface 924 onto one of plates 928 or 930. As described hereinabove regarding FIGS. 1-3, the position of light sources 902 and 904 determines which prism receives light from which source. For example, light source 902 may be directed to plate 928, and light source 902 may be directed to plate 930. The configuration (shape, position angle) of plates 928 and 930 determines the pixel position of the received light as projected by lens 932. Thus, by alternately applying light source 902 and light source 904, the perceived resolution of the projected image is double the resolution indicated by the pixel density of spatial light modulator 922. Because no need exists for an actuated plate, the configuration of FIG. 9 is more compact than other configurations that provide extended pixel resolution (XPR).

Figure 10:
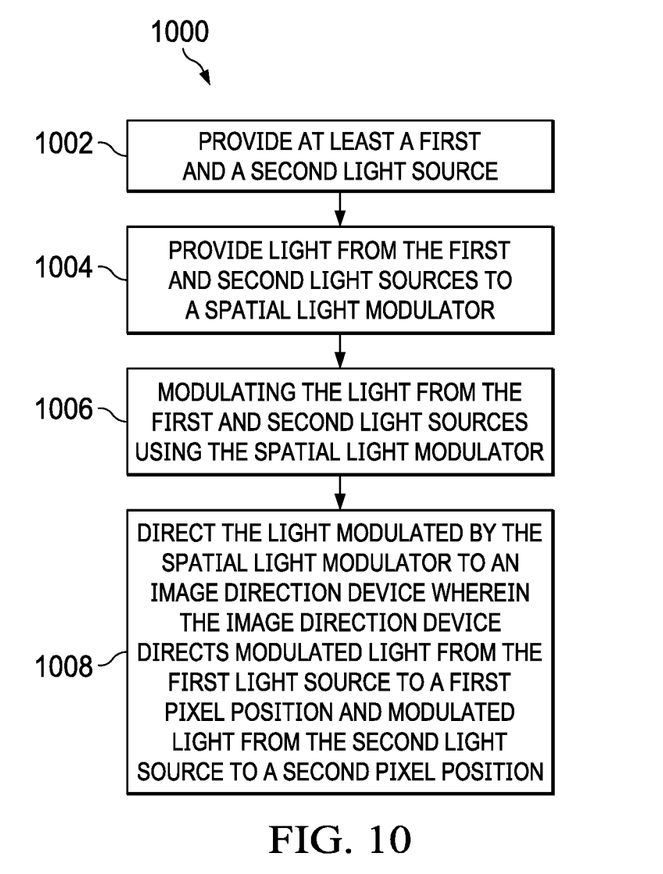
FIG. 10 is a flow diagram of an example method.

FIG. 10 is a flow diagram of an example method 1000. Step 1002 provides at least a first and a second light source. Step 1004 provides light from the first and second light sources to a spatial light modulator. Step 1006 modulates the light from the first and second light sources using a spatial light modulator. Step 1008 directs the light modulated by the spatial light modulator to an image direction device that directs modulated light from the first light source to a first pixel position and modulated light from the second light source to a second pixel position.

Figure 11:
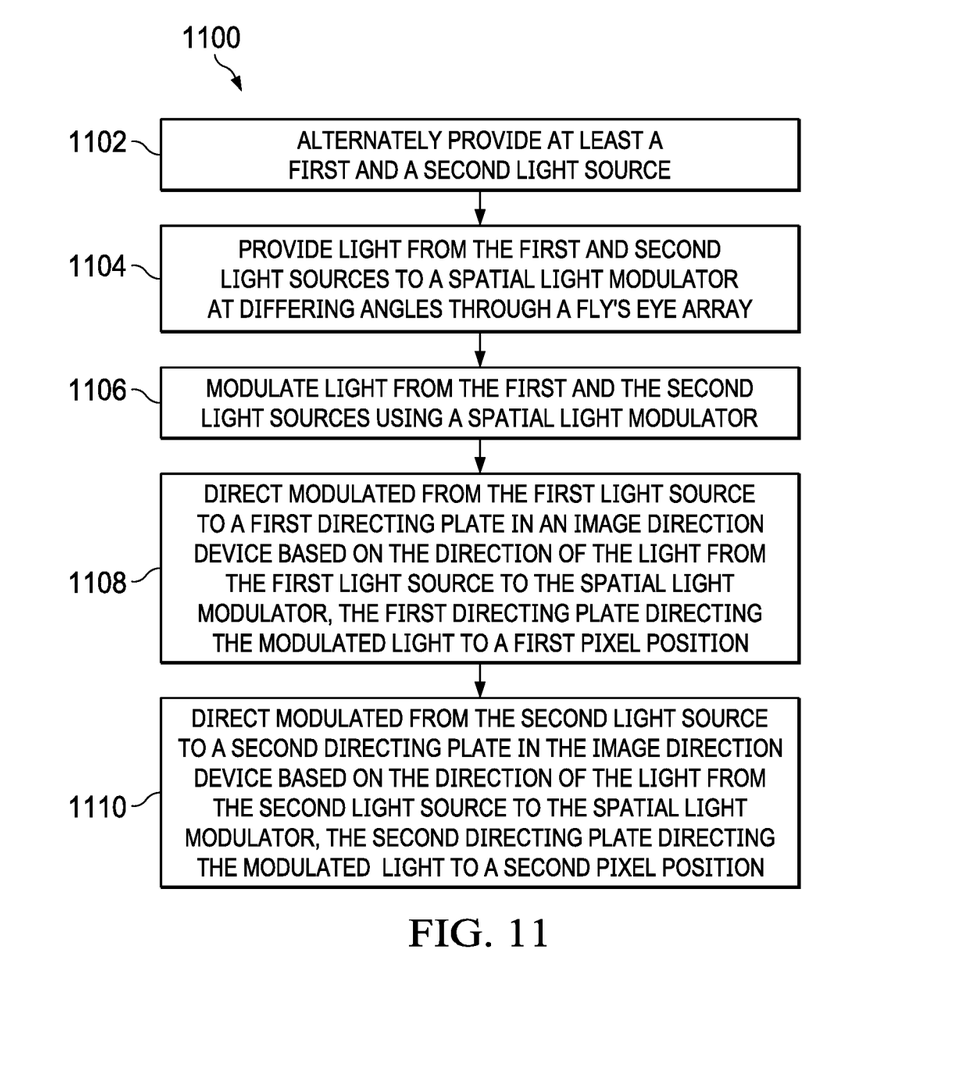
FIG. 11 is a flow diagram of another example method.

FIG. 11 is a flow diagram of another example method 1100. Step 1102 alternately provides at least a first and a second light source. Step 1104 provides light from the first and second light sources to a spatial light modulator at differing angles through a fly's eye array. Step 1106 modulates the light from the first and second light sources using the spatial light modulator. Step 1108 directs the modulated light from the first light source to a first directing plate in an image direction device, based on the direction of light from the first light source to the spatial light modulator. The first directing plate directs the modulated light to a first pixel position. Step 1110 directs the modulated light from the second light source to a second directing plate in an image direction device, based on the direction of light from the second light source to the spatial light modulator. The second directing plate directs the modulated light to a second pixel position.

Modifications are possible in the described examples, and other examples are possible, within the scope of the claims.

What is claimed is:

1. A projector comprising:
   a spatial light modulator configured to:
      receive first light at a first angle to the spatial light modulator;
      modulate the first light, to produce first modulated light;
      receive second light at a second angle to the spatial light modulator, the second angle different from the first angle; and
      modulate the second light, to produce second modulated light;
   an image direction device comprising:
      a first component; and
      a second component; and
   a lens optically coupled between the spatial light modulator and the image direction device, the lens configured to:
      receive the first modulated light;
      focus the first modulated light towards the first component, to produce first focused light;
      receive the second modulated light; and
      focus the second modulated light towards the second component, to produce second focused light.

2. The projector of claim 1, wherein the spatial light modulator is a digital micromirror device.

3. The projector of claim 2, wherein the digital micromirror device comprises at least two cupped mirrors.

4. The projector of claim 1, further comprising:
   a first light source configured to produce the first light; and
   a second light source configured to produce the second light.

5. The projector of claim 4, further comprising a fly's eye array optically coupled between the first light source and the spatial light modulator.

6. The projector of claim 4, wherein the fly's eye array is a first fly's eye array, the projector further comprising a second fly's eye array optically coupled between the second light source and the spatial light modulator.

7. The projector of claim 4, wherein the first and second light sources are configured to alternately provide the first and second light, respectively.

8. The projector of claim 4, wherein the first light source and the second light source are sections of a micro LED array.

9. The projector of claim 1, the first component of the image direction device configured to direct the first focused light to project a first image having a first pixel position and the second component of the image direction device configured to direct the second focused light to project a second image having a second pixel position.

10. The projector of claim 1, wherein the first component is a first plate and the second component is a second plate, wherein the second plate is lateral to the first plate.

11. The projector of claim 10, wherein the first plate is a flat plate, and the second plate is a trapezoidal plate.

12. The projector of claim 10, wherein the first plate is a first flat plate, and the second plate is a second flat plate tilted relative to the first flat plate.

13. A method comprising:
receiving, by a spatial light modulator, first light at a first angle to the spatial light modulator;
modulating, by the spatial light modulator, the first light, to produce first modulated light;
receiving, by the spatial light modulator, second light at a second angle to the spatial light modulator, the second angle different from the first angle;
modulating, by the spatial light modulator, the second light, to produce second modulated light;
receiving, by a lens, the first modulated light;
focusing, by the lens, the first modulated light towards a first component of an image direction device, to produce first focused light;
receiving, by the lens, the second modulated light;
focusing, by the lens, the second modulated light towards a second component of the image direction device, to produce second focused light;
directing, by the first component, the first focused light; and
directing, by the second component, the second focused light.

14. The method of claim 13, wherein the spatial light modulator is a digital micromirror device.

15. The method of claim 13, further comprising:
producing, by a first light source, the first light; and
producing, by a second light source, the second light.

16. The method of claim 15, wherein directing the first modulated light and the second modulated light comprises:
directing the first modulated light and the second modulated light based on respective directions of the first and second light from the first and second light sources.

17. The method of claim 13, wherein directing the first light comprises projecting a first image having a first pixel position, and wherein directing the second light comprises projecting a second image having a second pixel position.

18. The method of claim 13, wherein the first component is a first plate and the second component is a second plate, wherein the second plate is lateral to the first plate.

19. The method of claim 18, wherein the first plate is a flat plate, and the second plate is a trapezoidal plate.

20. The method of claim 18, wherein the first plate is a first flat plate, and the second plate is a second flat plate tilted relative to the first flat plate.

21. A system comprising:
a first light source configured to produce first light;
a second light source configured to produce second light;
a first fly's eye array;
a second fly's eye array;
at least one first lens optically coupled between the first light source and the second fly's eye array and between the second light source and the first fly's eye array, the at least one first lens configured to:
focus the first light towards the second fly's eye array, to produce first focused light; and
focus the second light towards the first fly's eye array, to produce second focused light, wherein the first fly's eye array is configured to homogenize the second focused light, to produce second homogenized light, and the second fly's eye array is configured to homogenize the first focused light, to produce first homogenized light;
a spatial light modulator; and
a second lens optically coupled to the first fly's eye array, to the second fly's eye array, and to the spatial light modulator, the second lens configured to:
focus the first homogenized light towards the spatial light modulator, to produce third focused light; and
focus the second homogenized light towards the spatial light modulator, to produce fourth focused light; and
wherein the spatial light modulator is configured to:
modulate the third focused light, to produce first modulated light; and
modulate the fourth focused light, to produce second modulated light.

22. The system of claim 21, wherein the first light source is configured to produce the first light during a first period of time, and the second light source is configured to produce the second light during a second period of time, the second period of time after the first period of time.

23. The system of claim 21, wherein the spatial light modulator is configured to:
receive the third focused light at a first angle; and
receive the fourth focused light at a second angle, wherein the second angle is different than the first angle.

24. The system of claim 21, wherein the at least one first lens comprises:
a third lens configured to focus the first light; and
a fourth lens configured to focus the second light.

25. The system of claim 21, further comprising:
an image direction device comprising:
a first component; and
a second component; and
a third lens optically coupled between the spatial light modulator and the image direction device, the third lens configured to:
receive the first modulated light;
focus the first modulated light towards the first component, to produce fifth focused light;
receive the second modulated light; and
focus the second modulated light towards the second component, to produce sixth focused light.

26. The system of claim 25, further comprising a fourth lens optically coupled to the image direction device, the fourth lens configured to:

project the first modulated light, to produce a first image; and project the second modulated light, to produce a second image.

\* \* \* \* \*